United States Patent Office 3,344,318
Patented Sept. 26, 1967

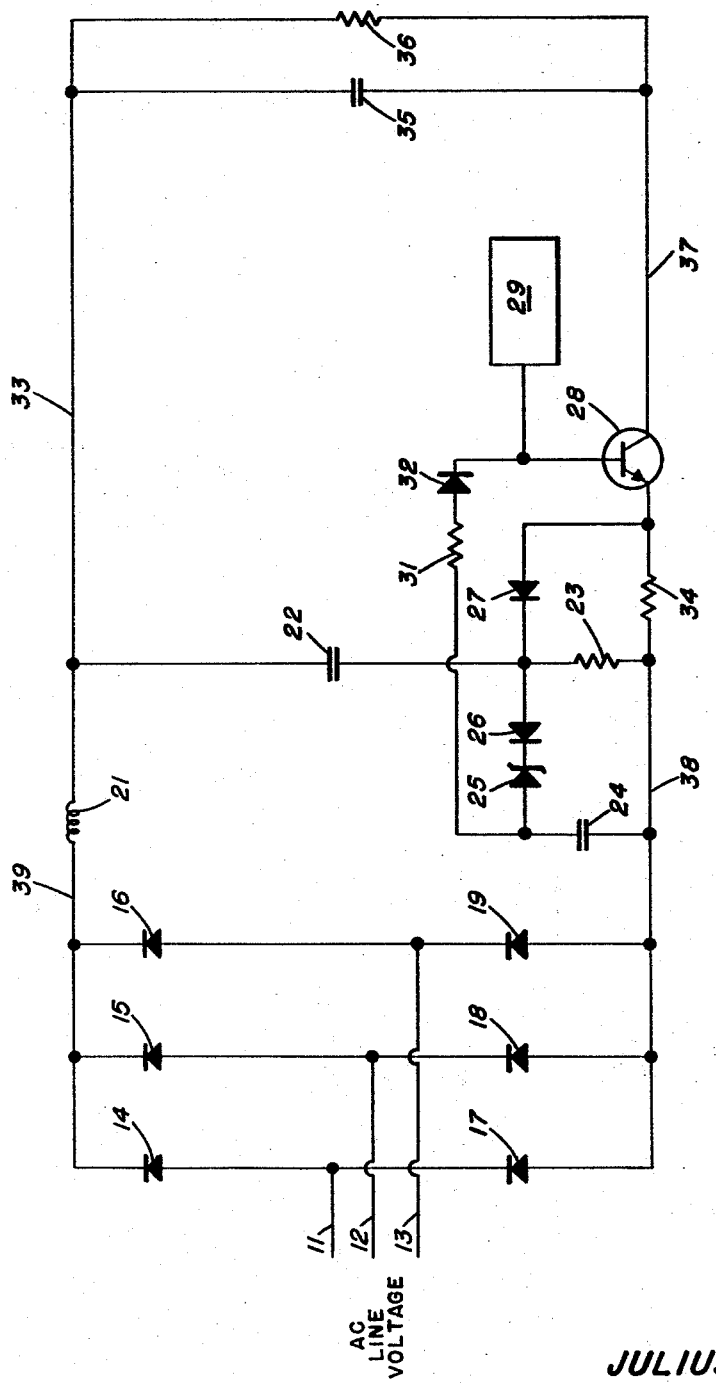
Sept. 26, 1967    J. E. WOLFF    3,344,318
SEMI-CONDUCTOR POWER SUPPLY REGULATOR AND
PROTECTIVE CIRCUITRY THEREFOR
Filed Nov. 30, 1964
INVENTOR
*JULIUS E. WOLFF*
BY
*Claude Funkhouser*
ATTORNEY
*Robert F. Beers*
AGENT

3,344,318
SEMI-CONDUCTOR POWER SUPPLY REGULATOR AND PROTECTIVE CIRCUITRY THEREFOR
Julius E. Wolff, Baltimore, Md., assignor, by mesne assignments, to the United States of America as represented by the Secretary of the Navy
Filed Nov. 30, 1964, Ser. No. 414,935
7 Claims. (Cl. 317—20)

ABSTRACT OF THE DISCLOSURE

A semiconductor circuit for protecting electronic components of a regulated power supply from line transient voltages having a voltage regulating transistor in series with the load and a filter network and damping resistor in parallel with the load to dampen oscillations generated by the filter network. A diode capacitance network is coupled to the filter network and the transistor to further reduce excessively high transient load voltages.

---

This invention relates to electronic voltage regulator circuitry and more particularly to semiconductor circuitry for protecting electronic components of regulated power supplies from damage which may occur to them due to turn-on and line transient voltages.

Many types of electronic circuitry apparatus require a constant output direct current voltage regulated against variations in input voltages. Conventional regulated power supplies in numerous applications usually employ transistorized circuitry for controlling the voltage output of the power supply above and below the nominal output voltage. Usually, the transistorized control circuitry takes the form of circuitry which varies in conductivity as the output voltage varies and this characteristic is used to restore the power supply output voltage to its nominal value. A distinct disadvantage in this type of regulated power supply apparatus is that the power requirements of the controlled transistorized circuitry may be exceeded by turn-on transients due to ringing occurring in the filter section of the regulated power supply or to line transients generated in the power source. Therefore, it is necessary to provide protective devices in regulated power supply circuitry, particularly those using semiconductors, which can faithfully withstand these turn-on and line transient voltage magnitudes.

The use of conventional overload devices such as fuses and circuit breakers have been wholly unsatisfactory as protective devices for transistorized electronic regulated power supplies which need fast-acting or short-time constant circuit breaking action to prevent damage to the power supply circuitry elements from overloads. The most common and frequently used of the above two overload devices is the fuse. The fuse is an expendable device which opens or disconnects the electronic circuit from the power source whenever the current through the electronic circuitry becomes excessive. It consists principally of a section of fusable element of such properties and physical proportions that excessive current flow through the element causes it to melt and thereby sever the circuit. The time required to melt the element depends upon the value of current flow and also depends upon the size, shape and material of the fusable element. At best, the fuse is a slow-acting device which is totally inadequate for circuitry systems which require fast-acting and reliable opening of the power source circuit upon a predetermined maximum power overload through the system. The circuit breaker on the other hand is a mechanical device which opens an electric circuit whenever excessive current flows through the circuit. The circuit breaker is much faster in opening the circuit than the fuse but it is still considered slow-acting for the required protection against turn-on transients or line transients. Further, the circuit breaker, by its inherent characteristic requires a device which is usually bulky, mechanically complex and expensive.

The method and electronic circuitry of the present invention overcomes the disadvantages of the prior art devices by providing a dependable, reliable and inexpensive circuitry for protecting the semiconductor elements used in regulated power supplies from turn-on transients. The circuitry is adaptable for use with a regulated power supply that is connected to either a three phase or single phase line or power source. A transient overshoot by turn-on or by a line transient is suppressed by a damp circuit a sufficient amount to protect the semiconductor regulating portion of the power supply from the transient voltage. Thus, the instant circuitry provides a completely electronic suppressing means that provides protection for regulated power supplies from turn-on transient overshoot voltages which may occur due to the ringing of the inductance and capacitance of the filter section of the regulated power supply and also provides protection against line transient voltages generated in the power source.

An object of the present invention is to provide an improved circuitry arrangement for protecting regulated power supplies from turn-on transients.

Another object of the present invention is to provide a completely electronic apparatus for the suppression of line source transients.

Still another object of the present invention is the provision of an electronic circuitry apparatus configuration that is dependable, reliable and inexpensive.

Another object of the present invention is the provision of an electronic circuitry apparatus that effectively suppresses line transients or turn-on transients to a safe level.

A further object of the present invention is the provision of a circuitry apparatus that permits the use of semiconductor control elements in a regulated power supply.

Still another object of the present invention is the provision of electronic circuitry which may be used with conventional regulated power supply circuits to provide them with protection against source transients or turn-on transients.

Still another object of the present invention is the provision of a method for protecting regulated power supplies from line and turn-on transients.

Other objects, advantages and novel features of the invention will become apparent from the following detailed description of the invention when considered in conjunction with the accompanying drawing wherein:

The figure shows a circuit arrangement of the invention.

With reference to the only figure in the drawing, there is illustrated a regulated power supply circuit with an electronic circuitry suppression means for protecting the regulating circuitry portion of the power supply from turn-on transients and/or line transients. The embodiment shown is a three phase regulated power supply circuit, but it is understood that the circuitry of the instant invention may be used in single phase regulated power supply circuits. Lines 11, 12 and 13 conduct the respective three phases from the alternating current line voltage supply, not shown, to the rectifying portion of the regulated power supply circuitry. Three sets of two diodes each, 14 and 17, 15 and 18, and 16 and 19, are connected across lines 38 and 39, respectively. Each set of diodes provides rectification for one phase of the three phase voltage. The respective sets of diodes are series connected together by connection of a cathode terminal to an anode terminal, and the respective lead-in lines 11, 12 and 13 are connected between the two series diodes. The filter section of the regulated power supply is shown as an inductance input filter. This power supply filter has the inductance 21 connected to the cathode side of diodes 14, 15 and 16, respectively via line 39. Connected to the opposite lead of inductor 21 is capacitor 22 which is series connected with resistor 23. Another filter capacitor 35 is parallel connected with respect to the network formed by capacitor 22 and resistor 23 by electrically connecting capacitor 35 between line 33 and line 37. A load resistor 36 is tied from line 33 and line 37. This connection places the load resistor in parallel with the two respective filter capacitors.

The output voltage across load resistor 36 is controlled by transistor 28. Transistor 28 is connected with its collector electrically connected to line 37 and its emitter electrically connected to resistor 34. The base of transistor 28 is electrically connected to functional block 29. Functional block 29 contains control circuitry for biasing transistor 28 so as to control the output voltage and is not shown in any detail. This circuitry may be any control circuitry suitable for use with regulated power supplies.

The electronic protective circuitry for NPN transistor 28 may be traced from its base via diode 32, resistor 31 and capacitor 24. Capacitor 24 has its other side electrically tied to line 38. Electrically connected between resistor 31 and capacitor 24 are Zener diode 25 and diode 26. Diode 26 is connected so that its anode side is between capacitor 22 and resistor 23. Also connected at this point is the cathode of another diode 27; the anode of diode 27 being connected to the emitter of transistor 28. A resistor 34 connects line 38 to the emitter of transistor 28. A resistor 34 connects line 38 to the emitter of transistor 28.

The resistance value of resistor 23 is set to damp the oscillator circuit of inductor 21 and capacitor 22. In most cases, this resistance network would be sufficient to protect transistor 28 from a transient voltage. After dampening of the transient voltage by the resistance network, the regulated power supply circuit goes into normal operation and load current flows through resistor 34. The resulting voltage developed from the load current flow through resistor 23 and resistor 34 causes diode 27 to conduct. This effectively provides a low impedance path around resistor 23 (a relatively high resistance) and resistance 34 (a relatively low resistance).

In the case of a transient at higher than normal line voltages, an excessive voltage may still appear across transistor 28 depending upon the relation between the time constants of the filter elements; inductor 21, capacitor 22, resistor 23 and control circuitry 29. The addition of a diode-capacitor-resistive network of Zener diode 25, diode 26, capacitance 24, resistance 31 and diode 32 is used to eliminate this condition. The transient voltage which appears across resistor 23 is rectified by Zener diode 25 and diode 26. The rectified voltage charges capacitor 24. Once capacitor 24 reaches its charged condition, base current is fed to the base of transistor 28 via series resistor 31 and diode 32. This base current will effectively reduce the voltage across the emitter and collector of transistor 28 during the transient period. The length of time which the base current is fed to transistor 28 will depend upon the time constant of the resistance 31 and capacitance 24. This time constant usually is made long enough to ensure that no voltage spikes will arise from any other time constants which may be present in the regulated voltage power supply circuitry. Now, assume that the transient voltage time is over and steady state condition is present in the circuitry. At steady state, the operation of the circuitry of resistor 23, resistor 34, and diode 27 will be as before. With diode 27 providing a low impedance path so that resistor 34 effectively parallels resistance 23. The Zener diode 25 is used to prevent small line voltage transients from causing current flow through resistor 31 and diode 32 to the base of transistor 28 after the steady state condition has been established in the power supply circuitry.

The present invention provides an effective protective circuitry to prevent the destruction of voltage regulating elements, such as transistors or the like, which may be damaged by turn-on transient voltages or line transient voltages. Also, the protective circuitry allows the use of relatively low voltage regulating elements due to efficient suppression of these transients. In addition, the protective circuitry is readily adaptable for use with many typical regulated power supply circuitries.

Obviously many modifications and variations of the present invention are possible in the light of the above teachings. It is therefore to be understood that within the scope of the appended claims the invention may be practiced otherwise than as specifically described.

What is claimed is:

1. In a regulated power supply apparatus that uses semiconductors as a regulating controlling means, a protective circuitry configuration for said semiconductors, comprising;
    alternating current filter means having a filter capacitor and a transistor regulating means,
    first resistance means connected in series arrangement with said filter capacitor,
    second resistance means operatively coupled between said first resistance means and said transistor regulating means, and
    diode means electrically connected in parallel with said first and second resistance means,
    whereby the first resistance provides damping of a sufficient amount to protect the semiconductor from transient voltages and the diode effectively reduces the value of the first resistance means once a steady state condition has been obtained in the regulated power supply apparatus.

2. The protective circuitry configuration as claimed in claim 1 wherein said first resistance means, consists of
    a relatively high value of resistance with respect to the value of resistance of said second resistance means.

3. The protective circuitry configuration as claimed in claim 1 wherein said diode means, consists of
    a semiconductor diode having its anode electrode connected to said semiconductor means and its cathode electrode connected to said filter capacitor.

4. A protective circuitry apparatus for semiconductor control means in a power supply regulating circuitry, comprising
    filter capacitor means,
    first and second resistance means connected in series arrangement between said filter capacitor means and said semiconductor control means,
    first diode means operatively connected to effectively parallel said first and second resistance means,
    diode-capacitance network means electrically connected to said filter capacitor means,
    control circuitry means for providing biasing current to said semiconductor control means, and
    impedance means operatively coupled between said diode capacitance network and said control circuitry means,
    whereby an excessive transient voltage that appears across the first resistance is rectified by the diode capacitance network and current is fed to the semiconductor control means to effectively reduce the voltage across the control means for the transient period.

5. The protective circuitry apparatus for semiconductor control means in a power supply regulating circuit of claim 4 wherein said diode-capacitance network means, comprises
    second diode means, having anode and cathode electrodes,
    Zener diode means, having anode and cathode electrodes, said cathode of said second diode connected to said cathode of said Zener diode, and
capacitor means operatively connected to said anode of said Zener diode.

6. The protective circuitry apparatus for semiconductor control means in a power supply regulating circuit of claim 5 wherein said impedance means, comprises a resistance-diode network.

7. The protective circuitry apparatus for semiconductor control means in a power supply regulating circuit of claim 5 wherein said impedance means, comprises series connected resistance and semiconductor diode.

References Cited

UNITED STATES PATENTS 3,119,951   1/1964   Davy _____ 317—49 X

MILTON O. HIRSHFIELD, *Primary Examiner.*

R. V. LUPO, *Assistant Examiner.*